Patented Jan. 20, 1931

1,789,352

UNITED STATES PATENT OFFICE

THOMAS S. CARSWELL, OF ST. LOUIS, MISSOURI, ASSIGNOR TO MONSANTO CHEMICAL WORKS, OF ST. LOUIS, MISSOURI, A CORPORATION OF MISSOURI

PROCESS FOR OBTAINING ISOEUGENOL

No Drawing. Application filed December 22, 1927. Serial No. 242,016.

This invention relates to processes of the kind that are used for producing or obtaining isoeugenol, and particularly, to the process that forms the subject-matter of the pending application for patent of James C. Ballantyne, filed July 12, 1926, under Serial No. 122,050, and entitled Process for producing isoeugenol and isochavibetol.

One object of my invention is to provide a novel process for obtaining pure isoeugenol that is substantially free of isomeric compounds.

Another object is to provide a process by which a mixture of alkyloxyisoeugenol and alkyloxyisochavibetol can be easily separated.

The Ballantyne process described in the pending application for patent above referred to contemplates converting a mixture containing alkyloxyisoeugenol and alkyloxyisochavibetol into a crystalline mixture of isoeugenol and isochavibetol by methylation and hydrolysis, and thereafter, separating the liquid isoeugenol from the crystalline isochavibetol. My process also contemplates starting with a mixture containing alkyloxyisoeugenol and alkyloxyisochavibetol, but instead of subjecting the said mixture to such treatment as to transform the isomers into isoeugenol and isochavibetol or homologues of isoeugenol and isochavibetol, as contemplated by the said Ballantyne process, I first subject the mixture to such treatment as to effect the separation of the alkyloxyisoeugenol from the alkyloxyisochavibetol, and thereafter, I separately transform each isomer into isoeugenol. By this procedure I am able to easily obtain pure isoeugenol substantially free of isomeric compounds.

In practising my process I start with a mixture of alkyloxyisoeugenol and alkyloxyisochavibetol obtained in any manner, as for example, by treating safrol or isosafrol with alcohol and caustic potash in an autoclave at about 135° C., when the following reaction takes place:

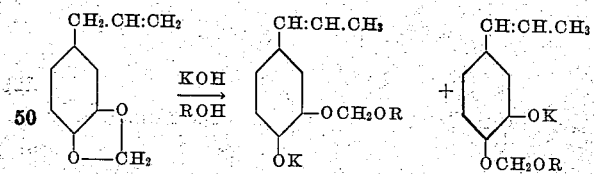

(Where R stands for alkyl group.) The excess of alcohol is removed, and the product is acidified, when a mixture is obtained which is composed of two isomers having the following constitution:

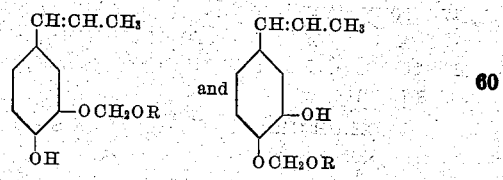

Said mixture is then separated, preferably by first treating the mixed isomers in alcohol solution in such a way as to form the calcium salts of the isomers, and thereafter, separating the calcium salt of alkyloxyisoeugenol from the calcium salt of alkyloxyisochavibetol by filtration, centrifuging or any other preferred procedure, it being possible to readily separate said salts, due to the fact that the calcium salt of alkyloxyisoeugenol, is relatively soluble in alcohol, and the other salt, i. e., the calcium salt of alkyloxyisochavibetol, is relatively insoluble. Instead of treating the mixed isomers in alcoholic solution, as above described, the mixed isomers can be first converted into the calcium salts and then treated with alcohol, so as to dissolve the calcium salt of isoeugenol, and said salt thereafter removed. In either case, the formation of the calcium salts is expressed by the following equations:

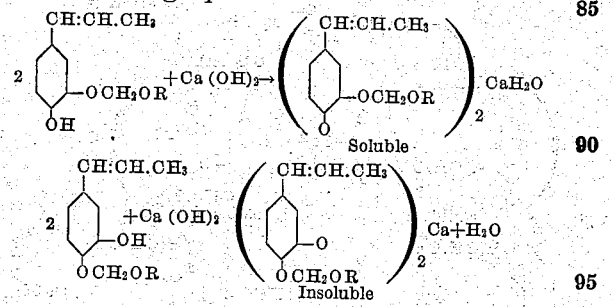

The filtrate or alcoholic liquor which contains the soluble calcium salt of alkyloxyisoeugenol is then treated so as to recover the alkyloxyisoeugenol, and the insoluble salt of alkyloxyisochavibetol is treated so as to recover the alkyloxyisochavibetol.

One procedure that may be followed in practising my process is as follows:

A mixture of alkyloxyisoeugenol and alkyloxyisochavibetol is obtained by mixing safrol with caustic potash and methyl alcohol, and heating said mixture in an autoclave. The product is poured into water, washed with benzol to remove isosafrol, acidified, extracted, and the extract carefully washed and distilled in vacuum, thereby producing a mixture of methoxyisoeugenol and methoxyisochavibetol. 300 gr. of the said isomeric mixture of methoxyisoeugenol and methoxyisochavibetol are then dissolved in 1950 cu. cen. of denatured alcohol, together with 66 gr. of calcium oxide. The mixture is stirred for 3 hours and filtered, centrifuged or otherwise treated to remove the insoluble salt. The filter cake is then washed with 500 cu. cen. of alcohol and said filter cake is then acidified, whereby a yield of 177 gr. of methoxyisochavibetol is obtained. The following series of reactions illustrates the above process up to this point:

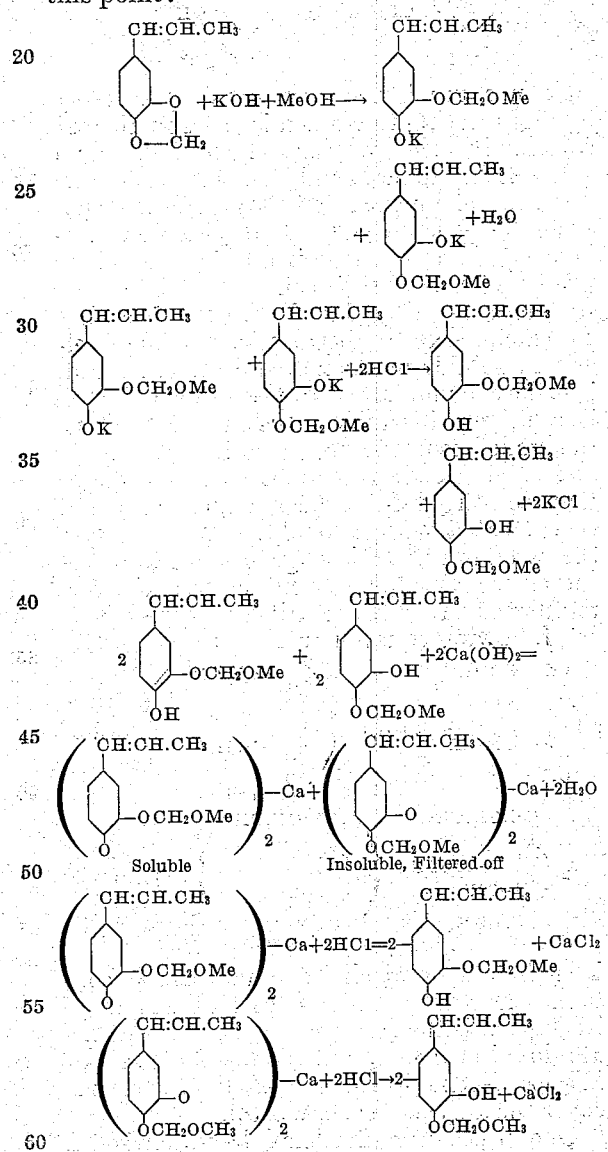

The filtrate resulting from the above described filtering operation is then diluted with 500 cu. cen. of water and is fractionally distilled so as to remove the alcohol. The residue from the distillation is then acidified, whereupon a yield of 120 gr. of methoxyisoeugenol is obtained. The separated isomers are then converted into isoeugenol in any suitable manner. It is immaterial what procedure is used to effect such conversion, but the following examples explain two different ways of carrying out this step of the process:

1. The methoxyisochavibetol is treated in alkaline solution with dimethyl sulfate. When the reaction is complete, the oil layer is separated and dissolved in aqueous alcohol. Dilute hydrochloric acid is added, and the mixture is heated until all of the methoxy group has been hydrolyzed. The acid is then neutralized and the alcohol is removed by fractional distillation. When the residue is cooled, isoeugenol separates as an oily layer. The oily layer is removed and distilled under vacuum, when there is obtained a distillate consisting of isoeugenol, practically pure and free from isomers.

The following series of reactions illustrates the operation of this stage of the process:

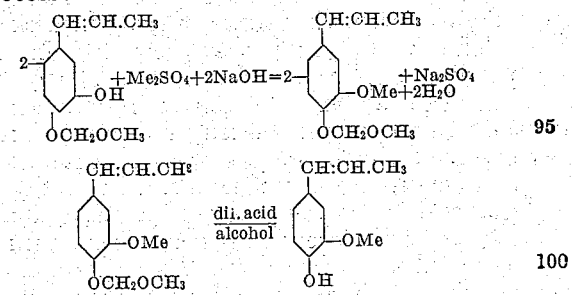

2. The methoxyisoeugenol is dissolved in aqueous alcohol containing a little hydrochloric acid, and the mixture is gently heated until the methoxy group is hydrolyzed. When this hydrolysis is complete, the mixture is cooled and an excess of sodium hydroxide is added. To this mixture is then added dimethyl sulfate. When the reaction is complete, the resulting mixture is fractionally distilled to remove the alcohol. The residue is acidified, when an oily layer separates. The oil layer is removed and distilled under vacuum, when there is obtained a further yield of isoeugenol, practically pure and free of isomers.

The following series of reactions illustrates the operation of this stage of the process:

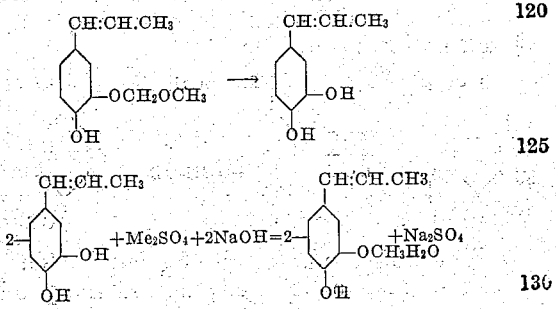

Another procedure that may be followed in practising my process is as follows:

1 kg. of an isomeric mixture of methoxyisoeugenol and methoxyisochavibetol obtained as previously described, or in any other way, is dissolved in 6.5 liters of 94% ethyl alcohol, and to this solution is added 0.29 kg. of calcium hydroxide. The mixture is stirred for 3 hours and filtered, centrifuged or otherwise treated to remove the insoluble salt. The filter cake is washed with 1.5 liters of alcohol and then sludged up with 5 liters of water. To this mixture is added 0.4 kg. of soda ash and the mass is boiled for 1 hour. After cooling, the mixture is filtered or otherwise treated to remove the insoluble calcium carbonate. The filtrate of this second filtering operation is acidified, whereby a yield of 0.6 kg. of methoxyisochavibetol will be obtained. The alcoholic filtrate of the first filtering operation is combined with the alcohol wash liquor and diluted with two liters of water and fractionally distilled to recover the alcohol. The distilled residue is then acidified, whereupon a yield of 0.3 kg. of methoxyisoeugenol is obtained.

The following series of reactions illustrate the operation of the above described process:

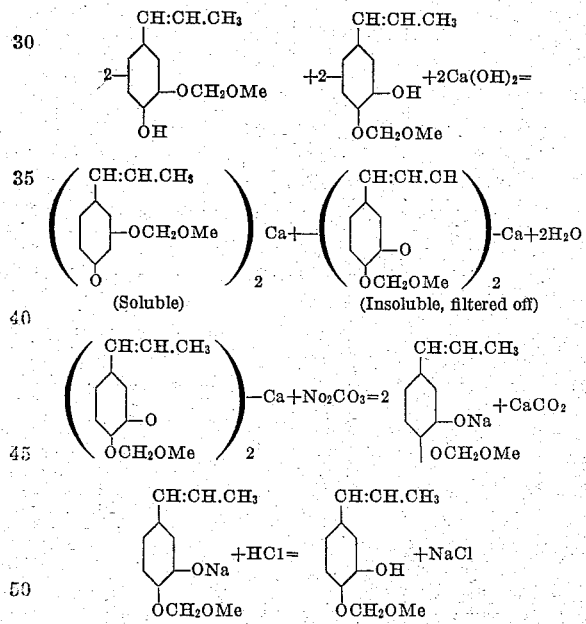

The separated isomers are then converted into isoeugenol, as specified in the first example of my process previously described.

Having thus described my invention, what I claim as new and desire to secure by Letters Patent is:

1. In a process for obtaining or producing isoeugenol, the procedure consisting in subjecting a mixture of alkyloxyisoeugenol and alkyloxyisochavibetol to such treatment as to convert said mixture into the calcium salts of the isomers, and separating the calcium salt of alkyloxyisoeugenol from the calcium salt of alkyloxyisochavibetol.

2. In a process for obtaining or producing isoeugenol, the procedure which consists in converting a mixture of alkyloxyisoeugenol and alkyloxyisochavibetol in alcoholic solution into the calcium salt of alkyloxyisochavibetol and the salt of alkoxy isoeugenol.

3. In a process for obtaining or producing isoeugenol, the procedure which consists in converting a mixture of methoxyisoeugenol and methoxyisochavibetol in alcoholic solution into the calcium salts of the isomers, and removing the insoluble calcium salt of methoxyisochavibetol.

4. A process for obtaining or producing isoeugenol, characterized by converting a mixture of alkyloxyisoeugenol and alkyloxyisochavibetol into the calcium salts of the isomers, treating the mixed calcium salts with alcohol so as to dissolve the soluble calcium salt of isoeugenol, and then removing the soluble calcium salt of alkyloxyisoeugenol.

5. A process for producing or obtaining isoeugenol, characterized by converting a mixture of methoxyisochavibetol and methoxyisoeugenol into the calcium salts of the isomers, treating the mixed calcium salts with alcohol so as to dissolve the soluble calcium salt of methoxyisoeugenol, and then removing the soluble calcium salt of methoxyisoeugenol.

6. In a process for obtaining or producing isoeugenol, the procedure which consists in converting a mixture of alkyloxyisochavibetol and alkyloxyisoeugenol in alcoholic solution into the calcium salts of the isomers, removing the insoluble salt of alkyloxyisochavibetol, and treating the separated calcium salts in such a way as to recover the alkyloxyisochavibetol and alkyloxyisoeugenol in a substantially pure state.

7. In a process for producing or obtaining isoeugenol, the procedure which consists in converting a mixture of methoxyisochavibetol and methoxyisoeugenol in alcoholic solution into the calcium salts of the isomers, by treatment with calcium oxide or calcium hydroxide, removing the insoluble salt of alkyloxyisochavibetol, and treating the separated calcium salts with an acidic body to recover the alkyloxyisochavibetol and alkyloxyisoeugenol in a substantially pure state.

8. A process for separating alkyloxyisochavibetol from alkyloxyisoeugenol, consisting in converting a mixture of such isomers into the calcium salts of the isomers, by treatment with calcium oxide or calcium hydroxide, treating the calcium salts with alcohol so as to dissolve the insoluble calcium salt of alkyloxyisoeugenol, removing the insoluble calcium salt of alkyloxyisochavibetol, and treating the separated calcium salts with an acidic body to recover the alkyloxyisochavibetol and alkyloxyisoeugenol in a substantially pure state.

9. A process for producing or obtaining isoeugenol, characterized by converting a mixture of methoxyisochavibetol and methoxyisoeugenol into the calcium salts of the isomers, by treatment with calcium oxide or calcium hydroxide, treating the calcium salts with alcohol and removing the insoluble calcium salt of alkyloxyisochavibetol, and thereafter treating the separated calcium salts with an acidic body to recover the alkyloxyisochavibetol and alkyloxyisoeugenol in a substantially pure state.

THOMAS S. CARSWELL.